(12) United States Patent
Alkove et al.

(10) Patent No.: US 8,397,069 B2
(45) Date of Patent: Mar. 12, 2013

(54) METHODS AND SYSTEMS FOR PROTECTING MEDIA CONTENT

(75) Inventors: James M. Alkove, Woodinville, WA (US); Stephen J. Estrop, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 213 days.

(21) Appl. No.: 12/715,529

(22) Filed: Mar. 2, 2010

(65) Prior Publication Data
US 2010/0161985 A1 Jun. 24, 2010

Related U.S. Application Data

(62) Division of application No. 10/798,688, filed on Mar. 11, 2004, now Pat. No. 7,703,141.

(51) Int. Cl.
*H04L 9/32* (2006.01)
(52) U.S. Cl. ........ 713/168; 713/165; 713/189; 713/193; 726/5; 726/32; 380/255; 380/285
(58) Field of Classification Search .................. None
See application file for complete search history.

(56) References Cited

U.S. PATENT DOCUMENTS

| | | | |
|---|---|---|---|
| 5,812,930 A | 9/1998 | Zavrel | |
| 5,825,879 A | 10/1998 | Davis | |
| 7,131,004 B1 | 10/2006 | Lyle | |
| 7,203,310 B2 | 4/2007 | England et al. | |
| 7,233,666 B2 * | 6/2007 | Lee et al. | 380/46 |
| 7,340,055 B2 * | 3/2008 | Hori et al. | 380/201 |
| 7,499,545 B1 * | 3/2009 | Bagshaw | 380/212 |
| 2002/0057795 A1 * | 5/2002 | Spurgat et al. | 380/1 |
| 2005/0060542 A1 * | 3/2005 | Risan et al. | 713/165 |

FOREIGN PATENT DOCUMENTS

| | | |
|---|---|---|
| EP | 1376302 | 1/2004 |
| JP | 2001075870(A) | 3/2001 |
| JP | 2003284024(A) | 10/2003 |
| JP | 2004062886(A) | 2/2004 |
| WO | WO0152020 | 7/2001 |

OTHER PUBLICATIONS

Hardware Platform for Next-Generation Secure Computing Base, pp. 1-11 Dec. 2001.*
Translated Japanese Office Action mailed Apr. 28, 2011 for Japanese Patent Application No. 2005-67120, a counterpart foreign application of US Patent No. 7,703,141.
Translated Chinese Office Action mailed on Dec. 9, 2010 for Chinese Application No. 201010192452.6, a counterpart foreign application of US Patent No. 7,703,141.
Translated Japanese Notice of Rejection for Japanese Patent Application No. 2005-067120, mailed on Dec. 28, 2010, 3 pgs.
Bellovin, "Defending Against Sequence Number Attacks" AT&T Research, IETF Standard, Internet Engineering Task Force, May 1996, pp. 1-3.

(Continued)

Primary Examiner — Shewaye Gelagay
(74) Attorney, Agent, or Firm — Lee & Hayes, PLLC

(57) ABSTRACT

Various embodiments provide methods and systems that utilize a protocol which enables media content protection by establishing a secure communication channel and, in some embodiments, a secure data channel, between a device such as a computing device running a protected content playback application, and a downstream component such as an associated driver, such as a graphics driver, of an associated display device such as a monitor, flat panel LCD, television and the like.

19 Claims, 6 Drawing Sheets

OTHER PUBLICATIONS

Microsoft: "Digital Rights Management for Audio Drivers" Microsoft WHDC, 'Online! Dec. 4, 2001, XP002342580, Retrived from the internet: URL:http://ww.microsoft.com/whdc/archive/DRM.mspx *the whole document*.

Gardan, D., et al., N. P (With and Without Priority) and Virtual Channel Protection: Comparison of Availability and Application to an Optical Transport Network, 7th Int'l. Conference on Reliability and Maintainability, Jun. 18, 1990, pp. 304-308.

Microsoft, "Hardware Platform for the Next-Generation Secure Computing Base" Window Platform Design Notes, 'Online! Dec. 4, 2001, Retrieved from the Internet: URL:http://ww.microsoft.com/whdc/archive/DRM.mspx *the whole document*.

Kim, Chung Lae, "Development of WDM Integrated Optical Protection Socket Module," Journal of Korean Institute of Telematics and Electronics, vol. 33A, No. 3, Mar. 1996, pp. 18-27.

Pruneda, A., "Windows Media Technologies: Using Windows Media Rights Manager to Protect and Distribute Digital Media," Dec. 2001, XP002291716, pp. 1-12.

Microsoft:"Security Model for the Next-Generation Secure Computing Base" Windows Platform Dexign Notes,'Online! 2003, XP002342582, Retrived from the Internet: URL:http://www.microsoft.com/resources/ngscb/documents/NGSCB_Security_Model.doc. *the whole document*.

Chinese Office Action mailed Oct. 26, 2011 for Chinese patent application No. 201010192452.6, a counterpart foreign application of US patent No. 7,703,141, 6 pages.

Translated Chinese Office Action mailed Jun. 1, 2012 for Chinese patent application No. 201010192452.6, a counterpart foreign application of US patent No. 7,703,141, 6 pages.

* cited by examiner

METHODS AND SYSTEMS FOR PROTECTING MEDIA CONTENT

RELATED APPLICATIONS

This patent application is a divisional application of, and claims priority to, commonly owned U.S. patent application Ser. No. 10/798,688, now U.S. Pat. No. 7,703,141, filed on Mar. 11, 2004, and entitled "METHODS AND SYSTEMS FOR PROTECTING MEDIA CONTENT" to inventors James M. Alkove, et al. The entire contents of the above Application are incorporated herein by reference.

TECHNICAL FIELD

This invention relates to methods and systems for protecting media content.

BACKGROUND

Content providers such as those that provide audio and/or video data in the form of data streams, application vendors that provide applications to render such data, and others often desire to protect such data from being ascertained, used or otherwise rendered by unauthorized entities. Such protection is typically desired from the point where the data resides, in some protected form and on some type of readable medium, along the chain of components that will handle or otherwise process such data, up to and including both the physical output connector that provides the data to a device such as a display or speakers, as well as these devices themselves.

As an example, consider FIG. 1 which illustrates, at a high level, an exemplary system 10 into which protected content 12, e.g. compressed and encrypted content, can be received and processed. In this example, protected content 12 is provided into a consumer device 14 such as a personal computer. Within the consumer device, an application 16 typically processes the protected content by, for example, using a decryption component 18 to decrypt the content and a decoder component 20 to decode or decompress the content. Once the content is decoded, it can typically undergo some processing, after which time the processed content is provided to a renderer component 22 which then ensures that the data is provided to a device, such as a display 24 (in the case of video data) and/or speakers 26 (in the case of audio data).

In this system, in order for the data to get to the appropriate hardware device such as the display or speaker, the data has to transit some type of bus, such as a PCI/AGP bus, and then has to travel through a physical connector and over a cable, such as an S-Video cable or a DVI cable.

Over time, various different types of content protection schemes and technologies have been developed and employed to protect the content when, for example, the content is decrypted within the consumer device 14 and then provided to an output device such as a display or speakers. These protection schemes and technologies are as varied as the different kinds of audio and video data. In addition, and perhaps what is most important is that today, there is no way for an application to securely control the behavior of collections of these various different types of content protection schemes and technologies.

More specifically, consider the chain of components that process data that is to be ultimately rendered on a hardware device. As will be appreciated by the skilled artisan, there are different layers of components that touch or otherwise have access to this data and associated communications from the application while the data and the communications are in the chain. For example, the application typically does not communicate directly to the hardware that is to render the data. Rather, there is typically a software stack in the user mode with which the application communicates, and then a driver stack in the kernel mode below the user mode software stack that actually communicates with the hardware. Effectively, any one of these components in the chain can actually tamper with the data and/or communications being passed along the chain.

Accordingly, this invention arose out of concerns associated with providing secure channels for both communications and data to flow from the application to downstream components.

DETAILED DESCRIPTION

Overview

Figure 1:
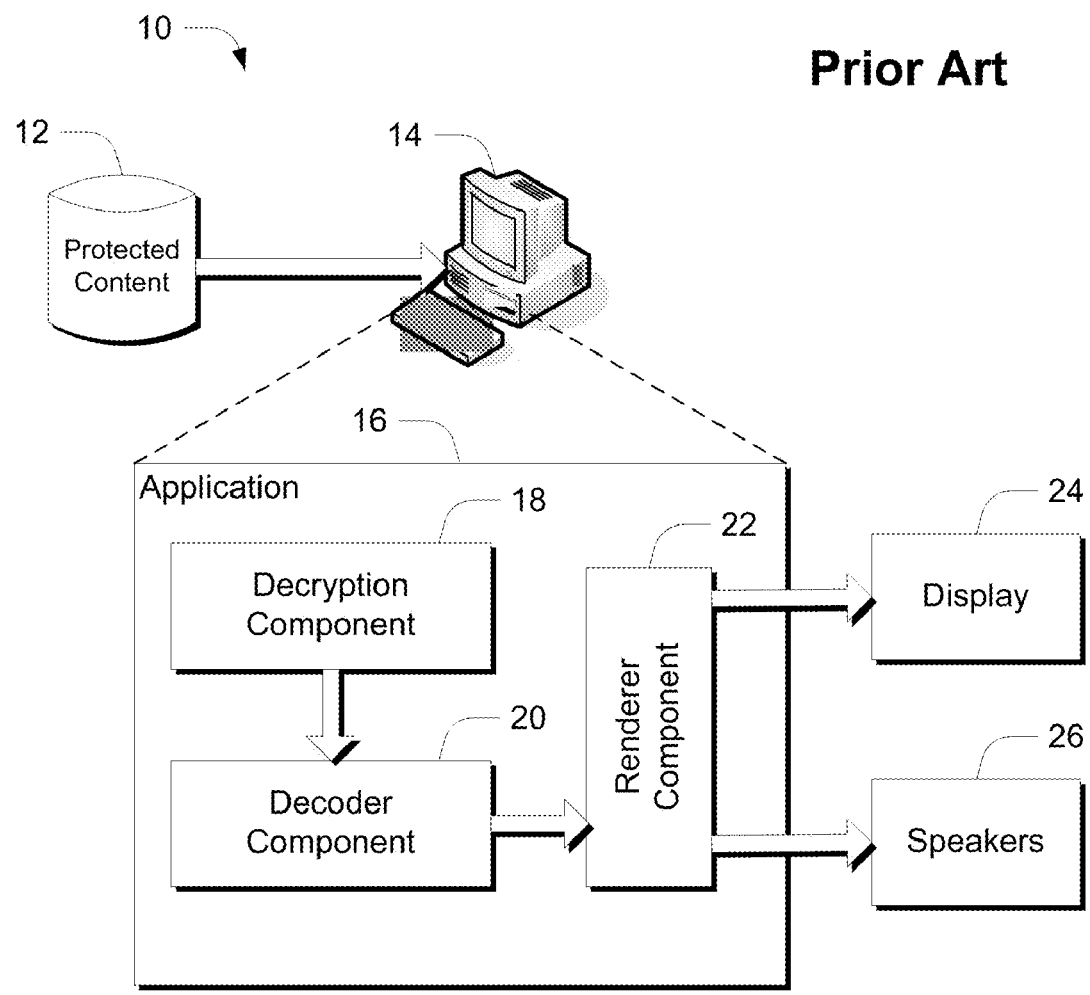
FIG. 1 is a high level block diagram of a system that can process media content.

Various embodiments pertain to methods and systems that utilize a protocol which enables media content protection by establishing a secure communication channel and, in some embodiments, a secure data channel, between a device such as a computer running a protected content playback application, and an associated driver, such as a graphics driver, of an associated display device such as a monitor, flat panel LCD, television and the like. Various embodiments are directed to addressing the needs of content providers and application vendors to signal that content protection should be applied to data that is output over a physical connector to a device such as a display device.

The various embodiments described below provide a means for securely passing commands from a user mode playback application to a driver, such as a graphics driver, and securely returning status information from the driver to the user mode application. In the embodiments described below, once a secure communication channel is established, the user mode application can instruct an associated driver to enable content output protection on the physical connector between the computer and the display device. Exclusivity of the secure channel session can prevent attackers from recording the protected content as it is transmitted from the computer to the display.

In the discussion that follows, the description of the various embodiments is directed along two separate but related lines. Specifically, in the section below entitled "Protocol for Establishing a Secure Channel from the Application to Downstream Components", a description of the inventive protocol is provided. This protocol is intended to be used in connection with any suitable system and is not necessarily tied to any one particular system or operating system. In the section entitled "Exemplary Implementation of Protocol on a Windows® Operating System", a description of the protocol is provided in the context of an implementation that involves a Windows® operating system. This description is intended to illustrate, among other things, one specific implementation and some of the design considerations associated with this specific implementation.

Protocol for Establishing a Secure Channel from the Application to Downstream Components In the discussion that follows, at least some embodiments are described that can be used to provide a secure signaling mechanism from an application to various downstream components so that the application can communicate which of a potential number of content protection technologies should be applied, and how at least some of those content protection technologies should be applied to protect media content output. In addition, and building on the notion of enabling and configuring different types of content protection, at least some of the embodiments are agnostic with respect to the type of content protection technology that is used to protect the media output. This is advantageous in that the described system and protocol are adaptively flexible and be used in connection with many different types of current and future content protection technologies, as will become apparent below.

Figure 2:
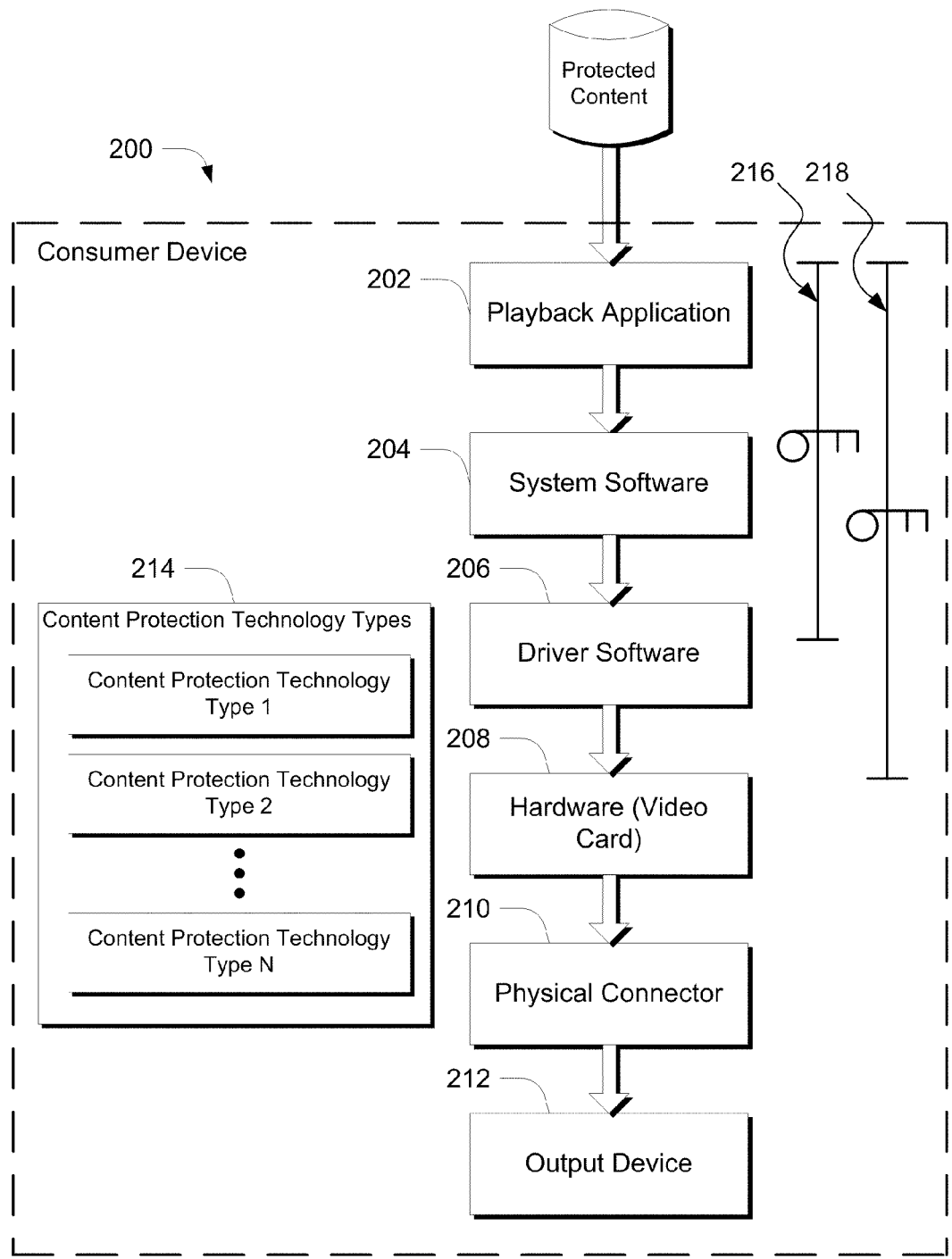
FIG. 2 is a block diagram of a system that is used to illustrate aspects of a protection protocol in accordance with one embodiment.

As an example overview of a typical system in which the inventive protocol can be used, consider FIG. 2 which shows a computing system in the form of a consumer device 200. Consumer device 200 can comprise any suitable type of consumer device that can be utilized to render protected media content. One example of such a device is a personal computer. Other types of devices can include personal video recorder (PVR) devices, digital video recorder (DVR) devices and the like.

Consumer device 200 comprises a playback application 202 that can acquire protected media content from a protected media content source, system software 204 that facilitates processing of the protected media content, and driver software 206 (or the software representation of associated hardware) that is utilized to interface with hardware 208 (such as a video card) that provides the processed media content over some type of physical connector 210 to an associated output device 212 over which the media content is rendered for a user. Examples of output devices include display devices and speakers, as noted above.

For purposes of the ongoing discussion, at least in this section, the types of playback applications, system software, driver software and hardware are not particularly relevant, as the skilled artisan will surely appreciate that there are many various different types of entities that can make up the chain between a playback application and the physical connector. As such, it is not the intent of this discussion to be limited to any one particular type of system.

In the illustrated and described embodiment, there are various different types of content protection technologies that can be utilized to protect the media content between the physical connector 210 and the output device 212. For example, various content protection types can include Analog Content Protection (ACP), Copy Generation Management System—Analog (CGMS-A), and High-bandwidth Digital Content Protection (HDCP), as will be appreciated by the skilled artisan. In the figure, these various different types of content protection technologies are illustrated at 214.

In accordance with the embodiments described herein, a secure link or channel is established between application 202 and one or more downstream components. In the illustrated example, two different secure channels are illustrated, although only one channel of either type need be implemented. Specifically, in one embodiment, a secure communication channel 216 is established between application 202 and driver software 206. In another embodiment, a secure channel 218 is established between application 202 and hardware 208.

In the illustrated and described embodiment, channel 216 can be utilized primarily for communication between the application and the driver. Such communication can include communicating commands, status requests and associated statuses between the application and the driver. Channel 218 can be used not only for this type of communication, but for providing the actual media data, such as audio and video data, to the hardware.

In the context of this document, a command is an instruction and can comprise, among other characteristics, the following characteristics. First, a command can alter or otherwise impact the configuration of the hardware 208. Alternately or additionally, a command can signal the hardware to process the media content in some specific way.

A status request can effectively retrieve, from the hardware, two sets of information. First, a status request can retrieve information that pertains to any commands that were sent from the application to a downstream component. For example, if the application sent a command to perform some task—for example setting a particular type of content protection technology—an associated status request might retrieve information as to whether the task was performed. Second, a status request can retrieve information that is not necessarily associated with whether a command was sent. For example, a status request might retrieve additional hardware configuration information that might be intrinsic to a particular device, e.g. the type of physical connector that is being utilized. Such status requests can also be used to ascertain which content protection technologies are supported by the hardware for a particular physical connector. For example, a physical connector may be a DVI connector, but there may not be HDCP support in the graphics hardware. As such, the application might then make an intelligent choice to either play a downsampled or lower resolution version of the video data or perhaps not play the video data at all.

Establishing a Secure Channel

In the illustrated and described embodiment, a one-way trust model and key transport protocol are utilized to establish trust between two endpoints of a communication chain. Using key transport carries with it a couple of advantages, as will be appreciated by the skilled artisan. First, with key transport, the responsibility for creating entropy is left with the entity that establishes trust—here application 202. Second, key transport provides the ability to do what is called "pass through". Pass through can allow content data to be encrypted all of the way along the chain to the graphics hardware. This, in turn, can allow the graphics hardware to decrypt the content data, decode the content data into an associated surface, and then process the content data onto a display, as will be appreciated by the skilled artisan.

Using channel 216 as an example, a one-way authenticated channel is established between application 202 and driver software 206 using, for example, Public Key Infrastructure (PKI) techniques. More specifically, in this example, a channel key in the form of a data integrity key is established between application 202 and driver software 206. Once the channel key is established, commands and status messages can be passed unencrypted and message authentication codes or MACs can be created with the data integrity key.

Figure 3:
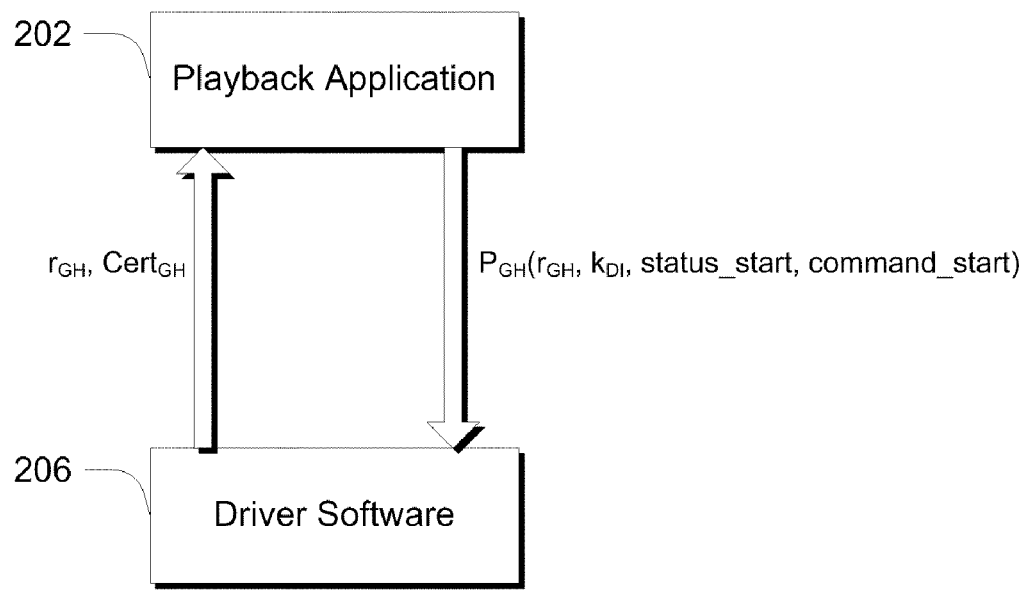
FIG. 3 is a block diagram that illustrates aspects of the inventive protection protocol in accordance with one embodiment.

As an example, consider the following in connection with FIG. 3. To establish trust with a downstream component, application 202 first calls driver software 206 and receives from the driver software a random number $r_{GH}$ and a digital certificate $Cert_{GH}$ associated with the hardware 208 (FIG. 2). When the application 202 receives the digital certificate $Cert_{GH}$, the application processes the certificate to verify that the signature on the digital certificate is provided by a trusted entity and to retrieve the public key ($P_{GH}$) of the driver software 206 (in the event channel 216 is utilized) or graphics hardware 208 (in the event channel 218 is utilized). The public key $P_{GH}$ can now be used by the application to encrypt data that can only be decrypted by an associated private key which is kept secure by the driver software or the graphics hardware. The process just described establishes trust between the application and the driver software.

After trust is established, the application can now set up the key transport. In this example, application 202 concatenates the random number $r_{GH}$ provided by the driver software, a data integrity key $k_{DI}$ (also called a session key), a random starting status sequence number (status_start) and a random starting command sequence number (command_start), encrypts the concatenation of values using the public key $P_{GH}$ of the driver software, and sends the encrypted data to the driver software 206. The process just described establishes the session key that is utilized between the application and the driver software. The random starting status sequence number (status_start) and random starting command sequence number (command_start) are utilized to ensure that if a particular message is lost, whether the message is a status request or a reported status (in the case of the starting status sequence number) or a command (in the case of the starting command sequence number), the intended message receiver can ascertain this fact. More specifically, each time a command is sent by the application, the random starting command sequence number is incremented by one. Similarly, each time a status message is sent, the sending entity increments the starting status sequence number by one. On the receiving end, the receiver of the message can ascertain whether a message has been lost by simply checking to see whether the sequence numbers occur in order. If there is a missing sequence number, then an associated message has been lost and appropriate action can be taken. In this manner, using random starting sequence numbers ensures the integrity and the order of the messages.

In one example, the values and descriptions set forth in the table just below can be utilized in the process just described.

| Value | Description |
| --- | --- |
| $r_{GH}$ | Random 32-bit random number generated by the graphics driver. |
| $Cert_{GH}$ | Variable length digital certificate of graphics hardware. |
| $P_{GH}(r_{GH}, k_{DI}, status\_start, command\_start)$ | Concatenation of 32-bit random number from the graphics driver, 128-bit random data integrity session key, 32-bit random starting status sequence number and 32-bit random starting command sequence number encrypted with the public key of the graphic hardware. This value is 2048 bits long. |

At this point in the process, a secure channel has been established between the application and the driver software.

The discussion that follows just below describes two portions of the inventive protocol—the command protocol and the status protocol.

Command Protocol

The command portion of the protocol enables the system's hardware, such as hardware 208 (FIG. 2), to be instructed by the application to turn on and in some instances configure a particular content protection technology such as HDCP or CGMS-A. In the illustrated and described embodiment, command messages are contained in an envelope that has two sections: a data section and a message authentication code or MAC section.

In the illustrated and described embodiment, the data section of the command message contains a command and an associated command sequence number. The message authentication code or MAC section contains what can be considered as a keyed hash of the command and associated command sequence number. The key that is used to produce the keyed hash is the data integrity key $k_{DI}$ described above.

Figure 4:
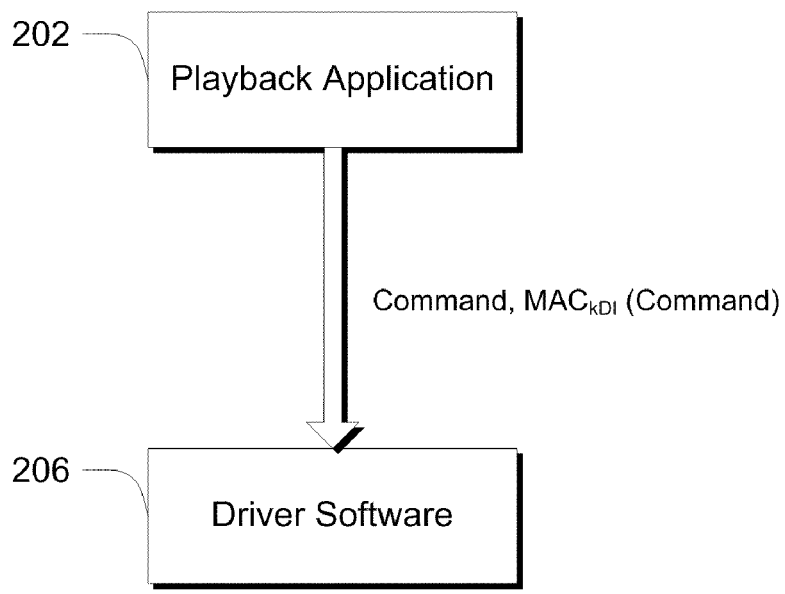
FIG. 4 is a block diagram that illustrates aspects of the inventive protection protocol in accordance with one embodiment.

As an example, consider FIG. 4, where application 202 is shown to be sending a command message to the driver software 206 of the form:

Command, $MAC_{kDI}$ (Command)

where the "Command" portion of the message includes not only an associated command from the application, but the associated command sequence number as well. The "$MAC_{kDI}$ (Command)" portion of the message comprises a MAC of the "Command" portion that was computed by the application. When the driver software 206 receives the command message, the driver software can run the MAC algorithm over the command portion of the message using the negotiated session key $k_{DI}$. Once the MAC algorithm has been run over the command portion of the command message, the driver software can compare this value with the MAC value received in the command message. If the two values compare favorably, then the integrity of the command message is established.

In one example, the values and descriptions set forth in the table just below can be utilized in the process just described.

| Value | Description |
| --- | --- |
| Command | Variable length command data. |
| $MAC_{kDI}$ (Command) | 128-bit MAC of the command data and command sequence number using the data integrity session key $k_{DI}$. |

Status Protocol

In the illustrated and described embodiment, status messages are contained in an envelope that has two sections: a data section and a message authentication code or MAC section. In this example, the message sender calculates a MAC of the status data using the session key $k_{DI}$ and an associated MAC algorithm.

Figure 5:
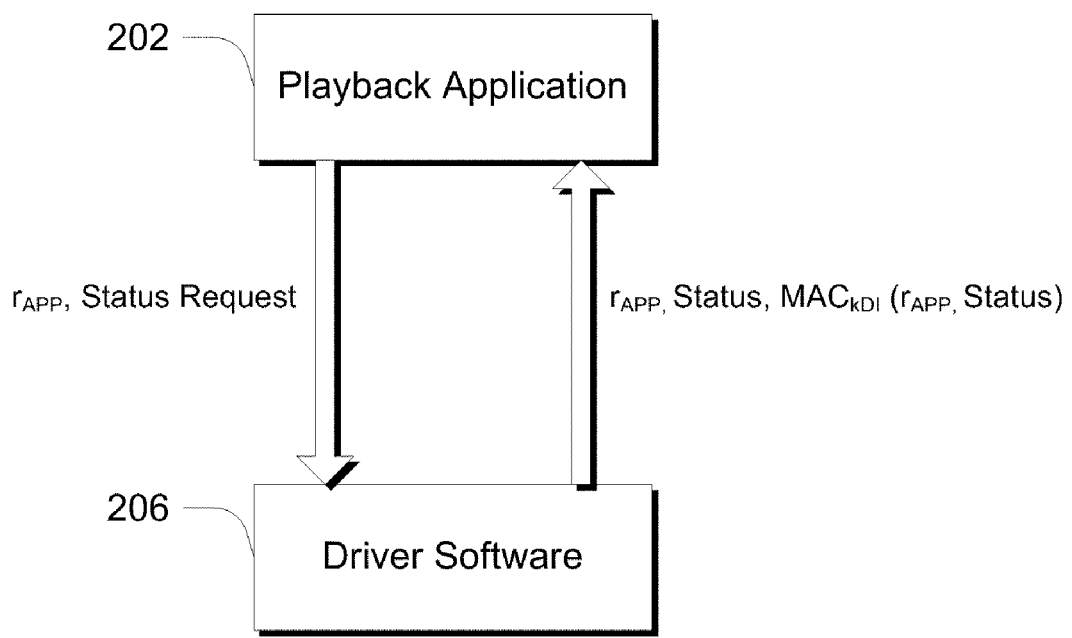
FIG. 5 is a block diagram that illustrates aspects of the inventive protection protocol in accordance with one embodiment.

As an example of how the status protocol can be implemented, consider FIG. 5. There, application 202 makes a request for status information in the form:

$r_{App}$, Status Request where $r_{App}$ is a random number generated by the application and "Status Request" is the actual request for status information. In response to receiving the status request from the application, driver software 206 ascertain whatever status information is appropriate and provides the status information, along with the appropriate status sequence number, into the data section of the envelope. In addition, the driver software also computes a MAC of the status information along with the random number provided by the application. The status message is then provided back to the application in the following form:

$r_{APP}$, Status, $MAC_{kDI}(r_{APP}, Status)$ where "Status" includes not only the status information, but the status sequence number as well. The $MAC_{kDI}(r_{APP}, Status)$ portion of the message comprises a MAC of the random number provided by the application and the status information. When the application receives the status message, it can compute a MAC of the random number and the status information by running the MAC algorithm over the random number and the status information and then can compare this value with the value in the $MAC_{kDI}(r_{APP}, Status)$ section of the message. By doing this, the application can confirm that the status message is genuine. The application can then use the contents of the message to verify that the status message is in the proper sequence (by virtue of the sequence number) and that the status information pertains to the status request that was previously sent by the application (by virtue of the random number $r_{APP}$).

In one example, the values and descriptions set forth in the table just below can be utilized in the process just described.

| Value | Description |
| --- | --- |
| $r_{APP}$ | 128-bit random number generated by the application. |
| Status | Variable length status data. |
| $MAC_{kDI}(r_{APP}, Status)$ | 128-bit MAC of the status data, status sequence number and the random number provided by the application using the data integrity session key $k_{DI}$. |

Exemplary Method

Figure 6:
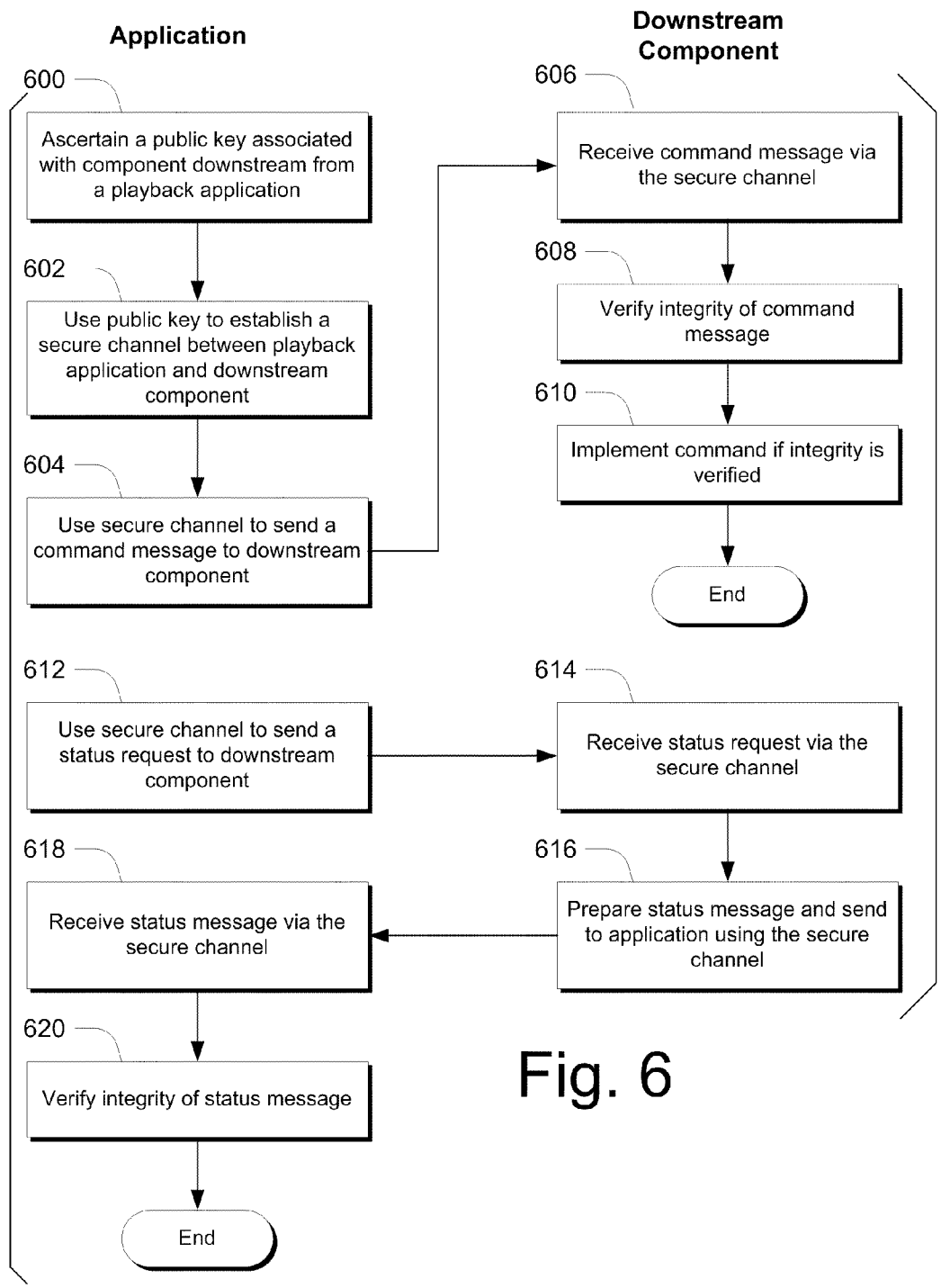
FIG. 6 is a flow diagram that describes steps in a method in accordance with one embodiment.

FIG. 6 illustrates steps in a method in accordance with one embodiment. The method can be implemented in connection with any suitable hardware, software, firmware or combination thereof. Additionally, in some software implementations, aspects of the method can be implemented as computer-readable instructions that reside on one or more computer-readable media and which are executed to perform the described methodology. In this example, the illustrated method is separated into two sections—one of which is labeled "Application", the other of which is labeled "Downstream Component". This is done to illustrate which entities perform the acts about to be described. Accordingly, those acts that appear under the label "Application" are performed by the application, and those acts that appear under the label "Downstream Component" are performed by a component that resides downstream of the application. In one embodiment, the downstream component can comprise driver software or a software representation of associated hardware that processes media data. In another embodiment, the downstream component can comprise hardware componentry itself.

One exemplary system that can implement the method about to be described is shown and described in connection with FIGS. 2-5 above. It is to be appreciated and understood that other systems can be utilized without departing from the spirit and scope of the claimed subject matter.

Step 600 ascertains a public key associated with a component downstream from a playback application. Examples of how this can be done are provided above. Step 602 uses the public key to establish a secure channel between the playback application and the downstream component. Collectively, steps 600 and 602 establish trust between the playback application and the downstream component. One example of how this trust can be established is described in connection with FIG. 3 above. Other ways can, of course, be used without departing from the spirit and scope of the claimed subject matter.

Step 604 uses the secure channel to send a command message to the downstream component. Any suitable command message structure can be utilized with but one example being given above in connection with FIG. 4. In addition, any suitable and/or appropriate types of commands can be sent from the application to the downstream component. In one embodiment, commands that can be sent direct the downstream component to enable a particular type of content protection technology to protect media content or data that is to be processed by the system.

Step 606 receives the command message via the secure channel. This step is performed by the downstream component to which the command message is sent. Step 608 then verifies the integrity of the command message. Any suitable method can be used to verify the integrity of the command message with but one example being given in connection with FIG. 4. Once the integrity of the command message is verified, step 610 implements an associated command contained in the command message.

Step 612 uses the secure channel to send a status request to the downstream component. Any suitable type of status request structure can be utilized with but one example being given above in connection with FIG. 5. Step 614 receives the status request via the secure channel and step 616 responsively prepares a status message and sends the status message to the application using the secure channel. Any suitable status message structure can be utilized with but one example being given above in connection with FIG. 5.

Step 618 receives the status message via the secure channel and step 620 verifies the integrity of the status message. Any suitable method can be used to verify the integrity of the status message, with but one example being given above.

Exemplary Implementation of Protocol on a Windows® Operating System

System Overview

Figure 7:
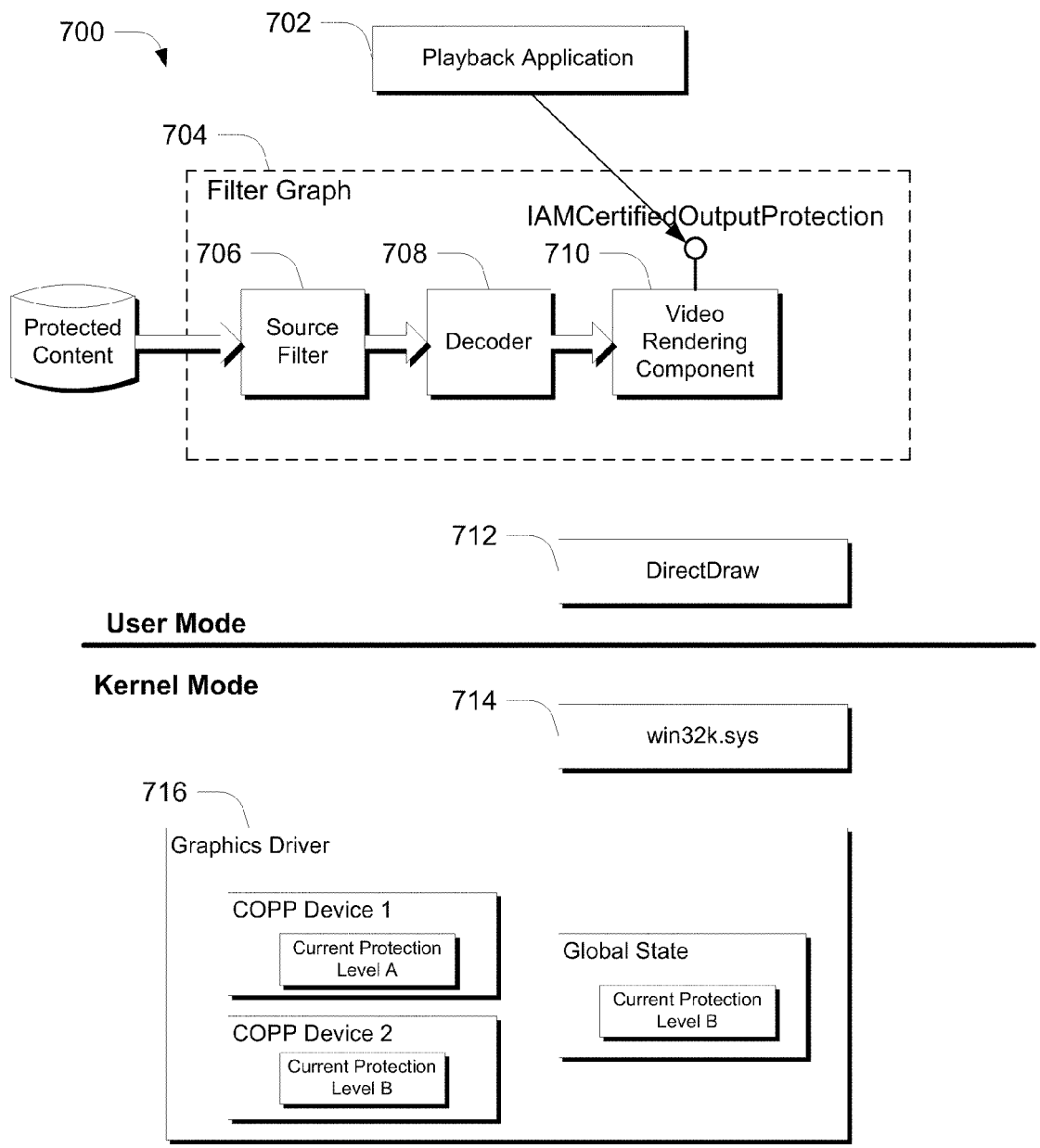
FIG. 7 is a block diagram that illustrates an exemplary system in connection with an implementation example.

FIG. 7 illustrates a system, generally at 700, which can be utilized to implement the secure channel protocol described above. In the discussion that follows, the inventive protocol is referred to as the Certified Output Protection Protocol or "COPP". In this example, Microsoft® DirectShow®, which is an architecture for streaming media, is used as an example. As will be appreciated by the skilled artisan, Microsoft® DirectShow® provides for high quality playback of multimedia streams and supports a wide variety of formats including Advanced Streaming Format (ASF), Motion Picture Experts Group (MPEG), Audio-Video Interleaved (AVI), MPEG Audio Layer-3 (MP3), and WAV files.

To achieve throughput that is necessary for streaming video and audio data, DirectShow® uses Microsoft® Direct-Draw® and Microsoft® DirectSound® to render data efficiently to the system's sound and graphics cards. Direct-Draw® is a display component of DirectX® that allows software designers to directly manipulate display memory, hardware blitters, hardware overlays, and flipping surfaces, as will be appreciated by the skilled artisan. DirectDraw® provides device-independent access to the device-specific display functionality in a direct 32-bit path. A 64-bit path also exists in the 64-bit versions of Windows®. DirectDraw® calls important functions in a driver that accesses the display card directly, without the intervention of the Windows® graphics device interface (GDI) or the device-independent bitmap (DIB) engine.

In DirectShow®, synchronization is achieved by encapsulating the multimedia data in time-stamped media samples. To handle the variety of different media sources, formats and hardware devices, DirectShow® uses a modular architecture in which operating system components called filters can be mixed and matched to provide support for many different scenarios. In the illustrated example, these filters can be assembled into a filter graph 704 that is utilized by a playback application 702 to cause multimedia data to be processed and rendered by a hardware device.

In this particular example, filter graph 704 comprises a source filter 706 that reads media content and a decoder 708 (e.g. a WMV or MPEG-2 decoder) that decompresses the content. A video rendering component 710 receives the decompressed content or data and understands the hardware on which the content is to be rendered. In this particular example, there are two different types of rendering components that can be utilized—a VMR7 (Video Mixing Renderer Version 7 written to the DirectX version 7 SDK) and a VMR9 (Video Mixing Renderer Version 9 written to the DirectX version 9 SDK) component.

In the illustrated example, a user mode DirectDraw® component 712 is provided and is a system-supplied dynamic-link library (DLL) that is loaded and called by DirectDraw® applications. This component provides hardware emulation, manages the various DirectDraw® objects, and provides display memory and display management services, as will be appreciated by the skilled artisan.

In addition, a kernel mode DirectDraw® component 714 is provided and is an integral part of win32k.sys. Kernel mode component 714 is the system-supplied graphics engine that is loaded by a kernel-mode display driver. This component performs parameter validation for the driver, thus making it easier to implement more robust drivers. A DirectDraw® graphics driver 716 is provided and is typically implemented by a third party hardware vendor.

In operation, the protected content typically has some set of policies associated with it. The policies can establish the type and level of content protection that is to be used when the associated content is rendered. For example, if the content is going to be played out over a DVI connector, then a policy might establish that HDCP has to be enabled or the content will not be played.

In the present example, application 702 is aware of the policies that are associated with the content. In practice, the source filter 706 can include a component that is responsible for ascertaining the policy associated with the content and then notifying the application.

User Mode Application Program Interface (API)

Once the policies have been extracted and the implications of the policies ascertained, system 700 first ascertains whether the policy can be enforced in this specific system. The way that this is accomplished, in this particular example, is through a user mode application program interface (API) called IAMCertifiedOutputProtection which is exposed by the video rendering component 710. In accordance with one embodiment, the IAMCertifiedOutputProtection interface consists of the following methods which can be called by the application:

```
typedef struct _AMCOPPSignature {
      BYTE         Signature[256];
} AMCOPPSignature;
typedef struct _AMCOPPCommand {
      GUID         macKDI;              //    16 bytes
      GUID         guidCommandID;       //    16 bytes
      DWORD        dwSequence;          //     4 bytes
      DWORD        cbSizeData;          //     4 bytes
      BYTE         CommandData[4056];   //  4056 bytes (4056+4+4+16+16 = 4096)
} AMCOPPCommand, *LPAMCOPPCommand;
typedef struct _AMCOPPStatusInput {
      GUID         rApp;                //    16 bytes
      GUID         guidStatusRequestID; //    16 bytes
      DWORD        dwSequence;          //     4 bytes
      DWORD        cbSizeData;          //     4 bytes
      BYTE         StatusData[4056];    //  4056 bytes (4056+4+4+16+16 = 4096)
} AMCOPPStatusInput, *LPAMCOPPStatusInput;
typedef struct _AMCOPPStatusOutput {
      GUID         macKDI;              //    16 bytes
      DWORD        cbSizeData;          //     4 bytes
      BYTE         COPPStatus[4076];    //  4076 bytes (4076+16+4 = 4096)
} AMCOPPStatusOutput, *LPAMCOPPStatusOutput;
```

| IAMCertifiedOutputProtection | | | |
|---|---|---|---|
| HRESULT | KeyExchange ( | | |
| | [out] | DWORD* pdwRandom | 32-bit random number generated by Graphics Driver |
| | [out] | BYTE** VarLenCertGH, | Graphics Hardware certificate, memory released by CoTaskMemFree |
| | [out] | DWORD* pdwLengthCertGH); | Length of Graphics Hardware certificate |

-continued

| IAMCertifiedOutputProtection | | | |
|---|---|---|---|
| HRESULT | SessionSequenceStart( | | |
| | [in] | AMCOPPSignature *pSig); | Concatenation of 32-bit random number from the graphics driver, 128-bit random data security session key, 128-bit random data integrity session key, 32-bit random starting status sequence number and 32-bit random starting command sequence number encrypted with the public key of the graphic hardware. This value is 2048 bits long. |
| HRESULT | ProtectionCommand( | | |
| | [in] | const AMCOPPCommand * cmd, | Encrypted command |
| HRESULT | ProtectionStatus( | | |
| | [in] | const AMCOPPStatusInput* pInput, | Description of feature we are requesting status on. |
| | [out] | AMCOPPStatusOutput* pOutput); | Returned status information |

In the above example, the AMCOPPCommand structure is the data structure that the application uses to send a command to a downstream component and would be used in an exchange such as the one illustrated in FIG. 4. The AMCOPP-StatusInput structure is the data structure that the application uses to make a status request and would be used in an exchange such as the one illustrated on the left side of FIG. 5. The AMCOPPStatusOutput structure is the data structure that the graphics driver uses to provide status information back to the application and would be used in an exchange such as the one illustrated on the right side of FIG. 5.

Kernel Mode DDI (DX-VA)

The DX-VA Certified Output Protection Protocol (COPP) provides a means for passing commands from User mode applications, such as playback application 702, to a driver such as graphics driver 716, and for returning status from the driver to the user mode applications. As noted above, the channel through which the commands and status flow is protected.

In this particular implementation, the Content Output Protection Protocol utilizes a DX-VA COPP device which is described in more detail below. In the discussion just below, the following terminology is used:

Video Stream: A Video Stream is the principal image data that comprises a displayed video frame. Pixels from the Video Stream are always opaque and do not contain any per-pixel alpha data.

Video Sub-stream: A Video Sub-stream is a channel of auxiliary image data that is required to be composited with a sample from the Video Stream prior to display of the combined Video frame. Examples of Video Sub-streams are NTSC Closed Caption images, DVD Sub-Picture images and PAL Teletext images. Another characteristic of Video Sub-streams is that they contain limited color range and per-pixel alpha information.

Video Session: A video session consists of a Video Stream and possibly one or more Video Sub-streams which get combined with the video stream before it is displayed on an output device connected to the computer. There may be several Video Sessions active on the computer at any particular time, there may also be several Video Sessions active within a single process.

DX-VA COPP Device: A new DX-VA device that supports receiving commands and status requests via the Content Output Protection Protocol.

Connector: The physical output connection between the graphics hardware and a display device.

Protection Type: The type of protection that can be applied to the signal being passed through a connector; more than one type of protection can be applied to a single connector.

Protection Level: The level of protection that is applied to signal being passed through a connector. This value is dependent on the protection type—some protections types, for example HDCP, have only two protection levels, these being "on" and "off".

Design Overview

In accordance with this embodiment, a single component known as a DX-VA COPP device is created for each video session. In the FIG. 7 example, two exemplary DX-VA COPP devices are shown within driver 716. The DX-VA COPP device represents an end point for COPP commands and status requests. In addition, a DX-VA COPP device can virtualize the protection settings of a physical connector. It is possible that a single physical connector can support multiple content protection types. For example, an S-Video connector may support Analog Content Protection and well as CGMS-A Line20 protection and CGMS-A Line21 protection. The COPP sample device driver code that appears later in this document shows one example of how a COPP device can be implemented by a driver.

In the illustrated and described embodiment, each DX-VA COPP device is configured to act appropriately when multiple video sessions are active on the computer. In this case, the driver 716 is asked to create multiple instances of the COPP DX-VA device as different processes try to configure the output display adapter settings via COPP. In the present example, two instances of a DX-VA COPP devices have been created by driver 716.

Local and Global Reference Counts

For each physical connector that supports content protection, driver 716 should maintain a global reference count for each type and for each level. In the illustrated and described embodiment, driver 716 comprises a global state component that maintains this global state.

When a COPP DX-VA device is created for a video session, the device should contain a local reference count for each protection type at each protection level. This is represented by the current protection level component inside each of the devices. A default level counter for the protection type should be set to the value 1, and all the other protection level counters for that type should be set to the value zero.

When a video session sets a new protection level for a particular protection type, the reference count for the current protection level is decremented and the reference count for the new protection level is incremented. Corresponding changes are also made to the global reference level counters.

Whenever any of the global level counters change, the driver should inspect all the counters for that connector and ensure that the protection level is set to level that corresponds with highest level counter whose value is greater than zero. In the present example, there are two different protection levels for an associated physical connector—level A and level B. Notice that the global state component indicates that level B protection is applied to the physical connector. As such, level B is the higher of the protection levels that can be applied to the physical connector. If DX-VA COPP device 2 terminates, then the global state component will apply protection level A to the physical connector. Exemplary code samples below illustrate how this might be done.

While the global reference counter is greater than zero, content protection should be applied to the output connector. As soon as the global reference counter reaches zero, content protection should be removed from the output connector. Whenever a driver receives a DestroyDevice call, the global reference counter should be decremented by the current level of the devices local reference counter. The connector protection should only be removed if the global reference counter for that connector reaches zero.

It should be noted that DestroyDevice may be called while the device still has local reference counter greater than zero, one example of this would be if the user mode process terminated abnormally.

Video Session Initialization

In the illustrated and described embodiment, video sessions are tied to a particular physical output connector. A video session, at the display driver level, is initialized by the following steps:

GetMoCompGuids is called to determine if a driver supports a DX-VA COPP device for the output connector.

Assuming the driver does support a DX-VA COPP device for the output connector CreateMoComp is called to create the DX-VA COPP device.

RenderMoComp is the called with a DXVA_COPPGetCertificateLengthFnCode function code to determine the length of the variable length graphics hardware certificate that should be used for this session.

RenderMoComp is called with a DXVA_COPPKeyExchangeFnCode function code to pass the Video Sessions Application certificate to the driver. The driver returns a 128 bit privacy key and a copy of its variable length graphics hardware certificate.

Finally, RenderMoComp is called with a DXVA_COPPSequenceStartFnCode function code to indicate that the Video Session has started with a 32 bit Command Sequence start code and 32 bit Status Sequence start code.

Details for the individual DX-VA RenderMoComp function codes are given below.

Handling Device Lost Conditions

The following conditions will cause DestroyMoComp entry point in the driver to be called while output content protection is still enabled for the specific Video Session:

Display Mode changes;

Attaching or detaching a monitor from the Windows® desktop;

Entering a full screen DOS box;

Starting any DDraw or D3D exclusive mode application;

Fast User Switching;

Adding or removing monitors from the Windows® desktop;

Locking the workstation or pressing Alt-Ctrl-Del on Windows® XP professional edition;

Attaching to the workstation via "Remote Desktop Connection";

Entering a power saving mode, for example "Suspend" or "Hibernate"; and

Unexpected application termination, for example a "page fault".

When this occurs the driver should decrement the global protection level count by the current local protection level count for the device being destroyed. The changed global protection level should be examined and the protection applied to the output connector should be adjusted accordingly.

DX-VA Commands

The following discussion describes a number of commands or functions that are supported by the graphics driver and, more particularly, the individual DX-VA COPP devices.

COPPOpenVideoSession

This function initializes the COPP DX-VA device that is being used for a particular video session.

```
HRESULT DXVA_COPPDeviceClass::COPPOpenVideoSession(
    DWORD dwDeviceID
    );
```

COPPCloseVideoSession

This function terminates the COPP DX-VA device that is being used for the video session.

```
HRESULT DXVA_COPPDeviceClass::COPPCloseVideoSession( );
```

It is possible that this function may be called while there is output protection still applied by the video session. The driver should undo the protection settings of this DX-VA COPP device and adjust the global protection settings accordingly.

COPPGetCertificateLength

This is the first function call that a newly created COPP DX-VA device will receive. It is used by the video rendering component 710 to query the length, in bytes, of the certificate used by the graphics hardware. The driver should return the correct length in the lpOutputData field of the DD_RENDERMOCOMPDATA structure.

```
HRESULT DXVA_COPPDeviceClass::COPPGetCertificateLength(
    [out] DWORD* pCertificateLength
    );
```

COPPKeyExchange

This is the second function call that a new created COPP DX-VA device will receive. The driver should return the variable length digital certificate of the graphics hardware. The lpOutputData field of the DD_RENDERMOCOMP-DATA structure points to a DXVA_COPPKeyExchangeOutput structure; the DXVA_COPPVariableLengthData field will have the required amount of space for the certificate as indicated in the previous COPPGetCertificateLength DXVA command.

```
typedef struct _DXVA_COPPSignature {
    BYTE       Signature[256];
} DXVA_COPPSignature, *LPDXVA_COPPSignature;
typedef struct _DXVA_COPPVariableLengthData {
    DWORD      Size;
    BYTE       Data[4];
} DXVA_COPPVariableLengthData,
*LPDXVA_COPPVariableLengthData;
typedef struct _DXVA_COPPKeyExchangeOutput {
    DWORD                        RandomNumber;
    DXVA_COPPVariableLengthData  Certificate;
} DXVA_COPPKeyExchangeOutput,
*LPDXVA_COPPKeyExchangeOutput;
HRESULT DXVA_COPPDeviceClass::COPPKeyExchange(
    [out] DWORD* pdwRandom,
    [out] DXVA_COPPVariableLengthData* pGHCertificate
    );
```

COPPSequenceStart

This will be the third functional call that the DX-VA COPP device will receive. The driver will receive a concatenation of a 128-bit random data integrity session key, 32-bit random starting status sequence number, and 32-bit random starting command sequence number encrypted with the public key of the graphic hardware. The driver should return E_UNEXPECTED if it receives this function call before it receives the COPPKeyExchange function call or if it receives a subsequent COPPSequenceStart call.

```
HRESULT DXVA_COPPDeviceClass::COPPSequenceStart(
    [in] DXVACOPPSignature* pSeqStartInfo
    );
```

COPPCommand

A COPP command can comprise an instruction from the video session to change a protection level on the physical connector associated with the DX-VA COPP device. The driver should be able to support multiple video sessions all playing back content through the same physical connector, as noted above.

```
typedef struct _DXVACOPPCommand {
    GUID    macKDI;            // 16 bytes
    GUID    guidCommandID;     // 16 bytes
    DWORD   dwSequence;        // 4 bytes
    DWORD   cbSizeData;        // 4 bytes
    BYTE    CommandData[4056]; // 4056 bytes
                               (4056+4+4+16+16 = 4096)
} DXVA_COPPCommand, *LPDXVA_COPPCommand;
typedef struct _DXVA_COPPSetProtectionLevelCmdData {
    DWORD   ProtType;
    DWORD   ProtLevel;
} DXVA_COPPSetProtectionLevelCmdData;
DEFINE_GUID (DXVA_COPPSetProtectionLevel,
    0x9bb9327c,0x4eb5,0x4727,0x9f,0x00,0xb4,0x2b,0x09,0x19,0xc0,
    0xda);
HRESULT DXVA_COPPDeviceClass::COPPCommand(
    [in]  DXVA_COPPCommand* pCommand
    );
```

The driver should return E_UNEXPECTED if it receives this function call before it receives the COPPKeyExchange or COPPSequenceStart function calls. Also, the driver should ensure that the parameters passed to it are valid for the given physical connector being used. The driver should return E_INVALIDARG if one or more of the parameters passed in the COPPCommand are not valid.

The table below lists the set of DX-VA COPP commands that a driver can expect to see in accordance with this embodiment.

| | Defined COPP Commands | |
|---|---|---|
| GUID | Interpretation of CommandData Parameter | Description |
| DXVA_COPPSetProtectionLevel 9bb9327c-4eb5-4727-9f00b42b0919c0da | DXVA_COPPSetProtectionLevelCmdData Valid values for ProtType member variable are: COPP_ProtectionType_ACP COPP_ProtectionType_CGMSA COPP_ProtectionType_HDCP | Sets the specified protection type to the specified protection level. |

COPPQueryStatus

A COPPQueryStatus is a request from the video session to retrieve information about the physical connector being used, the type of protection that can be applied to the content being transmitted through the physical connector, and the current protection level that is active on the physical connector. The same restriction about the order of the calls applies here: the driver should return E_UNEXPECTED if it receives this call before either COPPKeyExchange or COPPSequenceStart calls for this VideoSession.

```
typedef struct _DXVA_COPPStatusInput {
    GUID    rApp;              // 16 bytes
    GUID    guidStatusRequestID; // 16 bytes
    DWORD   dwSequence;        // 4 bytes
    DWORD   cbSizeData;        // 4 bytes
    BYTE    StatusData[4056];  // 4056 bytes
                               (4056+4+4+16+16 = 4096)
} DXVA_COPPStatusInput, *LPDXVA_COPPStatusInput;
typedef struct _DXVA_COPPStatusOutput {
    GUID    macKDI;            // 16 bytes
```

-continued

```
    DWORD      cbSizeData;           // 4 bytes
    BYTE       COPPStatus[4076];     // 4076 bytes
                                     (4076+16+4 = 4096)
} DXVA_COPPStatusOutput, *LPDXVA_COPPStatusOutput;
HRESULT DXVA_COPPDeviceClass::COPPQueryStatus(
    [out] DXVA_COPPStatusInput* pInput,
    [out] DXVA_COPPStatusOutput* pOutput
    );
```

The table below lists a set of DX-VA status requests that a driver should expect to see in accordance with this embodiment.

significant changes to kernel mode components, as will be appreciated by the skilled artisan. Thus, this section and the discussion below describes the COPP interface mapping to the existing DirectDraw and DX-VA DDI.

The DX-VA DDI is itself split into two functional groups: the "DX-VA container" and the "DX-VA device." The purpose of the DX-VA container DDI group is to determine the number and capabilities of the various DX-VA devices contained by the display hardware. Therefore, in this implementation example, a DX-VA driver can only have a single container, but it can support multiple DX-VA devices.

The rest of this section describes how the interface described above is mapped to the DX-VA device DDI. It

| | | Defined COPP Status Requests | |
|---|---|---|---|
| GUID | Input Data | Returned Data | Description |
| DXVA_COPPQuery ConnectorType 81d0bfd5-6afe-48c2- 99c0-95a08f97c5da | None | $r_{APP}$ (GUID 16 bytes) plus DWORD (4 bytes) COPP_ConnectorType_Unknown COPP_ConnectorType_VGA COPP_ConnectorType_SVideo COPP_ConnectorType_CompositeVideo COPP_ConnectorType_ComponentVideo COPP_ConnectorType_DVI COPP_ConnectorType_HDMI COPP_ConnectorType_LVDS | Returns the a value that identifies the type of physical connector the Video Session is currently using. |
| DXVA_COPPQuery ProtectionType 38f2a801-9a6c- 48bb-9107- b6696e6f1797 | None | $r_{APP}$ (GUID 16 bytes) plus DWORD (4 bytes) COPP_ProtectionType_Unknown COPP_ProtectionType_None COPP_ProtectionType_ACP COPP_ProtectionType_CGMSA COPP_ProtectionType_HDCP | Returns the available protection mechanism for the physical connector. These values can be "or'ed" together if multiple protection types are supported on a physical connector. |
| DXVA_COPPQuery LocalProtectionLevel b2075857-3eda- 4d5d-88db- 748f8c1a0549 | DWORD (4 Bytes) - Identifies the protection type that we require status upon. COPP_ProtectionType_ACP COPP_ProtectionType_CGMSA COPP_ProtectionType_HDCP | $r_{APP}$ (GUID 16 bytes) plus 2x DWORD (8 bytes) The first DWORD identifies the protection level of the specified protection type, the actual values returned depend on the protection type for this connector. The second DWORD identifies the integrity of the connection between the computer and the display device. The value returned could be either: COPP_LinkActive COPP_LinkLost | Returns the currently set protection level for the Video Session. |
| DXVA_COPPQuery GlobalProtectionLevel 1957210a-7766- 452a-b99a- d27aed54f03a | DWORD (4 Bytes) - Identifies the protection type that we require status upon. COPP_ProtectionType_ACP COPP_ProtectionType_CGMSA COPP_ProtectionType_HDCP | $r_{APP}$ (GUID 16 bytes) plus 2x DWORD (8 bytes) The first DWORD identifies the protection level of the specified protection type, the actual values returned depend on the protection type for this connector. The second DWORD identifies the integrity of the connection between the computer and the display device. The value returned could be either: COPP_LinkActive COPP_LinkLost | Returns the currently set protection level for the physical connector. |

DDI Mapping for User Mode APIs

In this particular implementation example, and for compatibility with the DDI infrastructure for Windows® operating systems, the API described earlier in this document must be "mapped" to the existing DDI for DirectDraw and DirectX VA. These mapping operations help to avoid having to make should be noted that unlike other DX-VA DDI's, COPP devices never reference any video memory surfaces.

Calling the DDI from a User-Mode Component

The sequence of steps to use the DDI from a user-mode component, such as the video rendering component 710 (FIG. 7) is as follows:

1. Call GetMoCompGuids to get the list of DX-VA devices supported by the driver.
2. CreateMocomp is called to establish a COPP device for the video session, where the COPP device GUID is defined as follows:
   DEFINE_GUID(DXVA_COPPDevice, 0xd2457add, 0x8999,0x45ed,0x8a,0x8a,0xd1,0xaa,0x04,0x7b, 0xa4,0xd5);
3. The video rendering component then calls the COPP device's RenderMocomp with varying function parameter values depending on the type of COPP operation being requested.
4. When the video rendering component no longer needs to perform any more COPP operations, it calls DestroyMocomp.
5. The driver releases any resources used by the COPP device.

COPPOpenVideoSession

This method maps directly to a CreateMoComp method of the DD_MOTIONCOMPCALLBACKS structure, where the GUID is the COPP Device GUID, pUncompData points to a structure that contains no data (all zeros), and pData points to NULL.

It should be appreciated and understood that if a driver supports accelerated decoding of compressed video, the video rendering component will call the driver to create two DX-VA devices—one to perform the actual video decoding work as defined by the DirectX VA Video Decoding specification, and the other to be used strictly for applying protection to output connectors following the Content Output Protection Protocol.

Example

Mapping CreateMoComp to COPPOpenVideoSession

The sample code provide just below shows how a driver should map the CreateMoComp DDI call into calls to COPPOpenVideoSession. The sample code shows only how the CreateMoComp function is used for COPP. If a driver supports other DX-VA functions, such as decoding MPEG-2 video streams, the sample code below can be extended to include processing of additional DX-VA GUIDs.

```
DWORD APIENTRY
CreateMoComp(
    LPDDHAL_CREATEMOCOMPDATA lpData
    )
{
    AMTRACE((TEXT("CreateMoComp ")));
    if (!ValidDXVAGuid(lpData->lpGuid))
    {
        DbgLog((LOG_ERROR, 1,
            TEXT("No formats supported for this GUID")));
        lpData->ddRVal = E_INVALIDARG;
        return DDHAL_DRIVER_HANDLED;
    }
    if (*lpData->lpGuid == DXVA_COPPDevice)
    {
        DXVA_COPPDeviceClass* lpDev =
            new DXVA_COPPDeviceClass(*lpData->lpGuid,
                DXVA_DeviceCOPP);
        if (lpDev)
        {
            DWORD DevID = (DWORD)-1;
            lpData->ddRVal = E_INVALIDARG;
            if (DevID != (DWORD)-1)
            {
                lpData->ddRVal =
                    lpDev->COPPOpenVideoSession(DevID);
            }
            if (lpData->ddRVal != DD_OK)
            {
                delete lpDev;
                lpDev = NULL;
            }
        }
        else
        {
            lpData->ddRVal = E_OUTOFMEMORY;
        }
        lpData->lpMoComp->lpDriverReserved1 =
            (LPVOID) (DXVA_DeviceBaseClass*)lpDev;
        return DDHAL_DRIVER_HANDLED;
    }
    lpData->ddRVal = DDERR_CURRENTLYNOTAVAIL;
    return DDHAL_DRIVER_HANDLED;
}
```

Example

Implementing GetMoCompGuids

In addition to the CreateMoComp DDI function, the driver should also implement the GetMoCompGuids method of the DD_MOTIONCOMPCALLBACKS structure. The following sample code shows one possible way of implementing this function in your driver.

```
DWORD g_dwDXVANumSupportedGUIDs = 1;
const GUID* g_DXVASupportedGUIDs[1] = {
    &DXVA_COPPDevice
};
DWORD APIENTRY
GetMoCompGuids(
    PDD_GETMOCOMPGUIDSDATA lpData
    )
{
    DWORD dwNumToCopy;
    if (lpData->lpGuids) {
        dwNumToCopy = min(g_dwDXVANumSupportedGUIDs,
                lpData->dwNumGuids);
        for (DWORD i = 0; i < dwNumToCopy; i++) {
            lpData->lpGuids[i] = *g_DXVASupportedGUIDs[i];
        }
    }
    else {
        dwNumToCopy = g_dwDXVANumSupportedGUIDs;
    }
    lpData->dwNumGuids = dwNumToCopy;
    lpData->ddRVal = DD_OK;
    return DDHAL_DRIVER_HANDLED;
```

COPPGetCertificateLength

This method maps directly to a RenderMoComp method of the D_MOTIONCOMPCALLBACKS structure, where:
   dwNumBuffers is zero.
   lpBufferInfo is NULL.
   dwFunction is defined as DXVA_COPPGetCertificateLengthFnCode.
   lpInputData is NULL.
   lpOutputData will point to a single DWORD.

Note that for the DX-VA device used for COPP, RenderMoComp will be called without calling BeginMoCompFrame or EndMoCompFrame.

Example

Mapping RenderMoComp to COPPGetCertificateLength

The sample code below shows how a driver should map the RenderMoComp DDI call into calls to COPPGetCertificateLength. The sample code only shows how the RenderMoComp function is used for COPP control. If a driver supports other DX-VA functions, such as decoding MPEG-2 video streams, the sample code can be extended to include processing of additional DX-VA GUIDs.

```
DWORD APIENTRY
RenderMoComp(
    LPDDHAL_RENDERMOCOMPDATA lpData
    )
{
    AMTRACE((TEXT("RenderMoComp")));
    DXVA_DeviceBaseClass* pDXVABase =
        (DXVA_DeviceBaseClass*)
            lpData->lpMoComp->lpDriverReserved1;
    if (pDXVABase == NULL) {
        lpData->ddRVal = E_POINTER;
        return DDHAL_DRIVER_HANDLED;
    }
switch (pDXVABase->m_DeviceType) {
case DXVA_DeviceCOPP:
    {
        DXVA_COPPDeviceClass* pDXVACopp =
            (DXVA_COPPDeviceClass*)
                lpData->lpMoComp->lpDriverReserved1;
        switch (lpData->dwFunction)
        {
        case DXVA_COPPGetCertificateLengthFnCode:
            {
                if (lpData->dwOutputDataSize < sizeof(DWORD))
                {
                    lpData->ddRVal = E_INVALIDARG;
                }
                else
                {
                    lpData->ddRVal =
                        pDXVACopp->COPPGetCertificateLength(
                            (DWORD*)lpData->lpOutputData);
                }
            }
            break;
```

COPPKeyExchange

This method maps directly to a RenderMoComp method of the D_MOTIONCOMPCALLBACKS structure, where:
  dwNumBuffers is zero.
  lpBufferInfo is NULL.
  dwFunction is defined as DXVA_COPPKeyExchangeFnCode.
  lpInputData is NULL.
  lpOutputData will point to a DXVA_COPPKeyExchangeOutput data structure.

Note that for the DX-VA device used for COPP, RenderMoComp will be called without calling BeginMoCompFrame or EndMoCompFrame.

Example

Mapping RenderMoComp to COPPKeyExchange

The sample code below shows how a driver should map the RenderMoComp DDI call into calls to COPPKeyExchange. The sample code only shows how the RenderMoComp function is used for COPP control. If a driver supports other DX-VA functions, such as decoding MPEG-2 video streams, the sample code can be extended to include processing of additional DX-VA GUIDs.

```
case DXVA_COPPKeyExchangeFnCode:
    {
        DXVA_COPPKeyExchangeOutput* lpout =
            (DXVA_COPPKeyExchangeOutput*)
                lpData->lpOutputData;
        lpData->ddRVal = pDXVACopp->COPPKeyExchange(
            &lpout->RandomNumber,
            &lpout->Certificate);
    }
    break;
```

COPPSequenceStart

This method maps directly to a RenderMoComp method of the D_MOTIONCOMPCALLBACKS structure, where:
  dwNumBuffers is zero.
  lpBufferInfo is NULL.
  dwFunction is defined as DXVA_COPPSequenceStartFnCode.
  lpInputData will point to a DXVA_COPPSignature data structure.
  lpOutputData is NULL.

Note that for the DX-VA device used for COPP, RenderMoComp will be called without calling BeginMoCompFrame or EndMoCompFrame.

Example

Mapping RenderMoComp to COPPSequenceStart

The sample code below shows how a driver should map the RenderMoComp DDI call into calls to COPPSequenceStart. The sample code only shows how the RenderMoComp function is used for COPP control. If a driver supports other DX-VA functions, such as decoding MPEG-2 video streams, the sample code can be extended to include processing of additional DX-VA GUIDs.

```
case DXVA_COPPSequenceStartFnCode:
    {
        DXVA_COPPSignature* lpin =
            (DXVA_COPPSignature*)lpData->lpInputData;
        lpData->ddRVal = pDXVACopp->COPPSequenceStart(lpin);
    }
    break;
```

COPPCommand

This method maps directly to a RenderMoComp method of the D_MOTIONCOMPCALLBACKS structure, where:
  dwNumBuffers is zero.
  lpBufferInfo is NULL.
  dwFunction is defined as DXVA_COPPCommandFnCode.
  lpInputData will point to a DXVA_COPPCommand data structure.
  lpOutputData is NULL.

Note that for the DX-VA device used for COPP, RenderMoComp will be called without calling BeginMoCompFrame or EndMoCompFrame.

Example

Mapping RenderMoComp to COPPCommand

The sample code below shows how a driver should map the RenderMoComp DDI call into calls to COPPCommand. The sample code only shows how the RenderMoComp function is used for COPP control. If a driver supports other DX-VA functions, such as decoding MPEG-2 video streams, the sample code can be extended to include processing of additional DX-VA GUIDs.

```
case DXVA_COPPCommandFnCode:
    {
        DXVA_COPPCommand* lpin =
            (DXVA_COPPCommand*)lpData->lpInputData;
        lpData->ddRVal = pDXVACopp->COPPCommand(lpin);
    }
    break;
```

COPPQueryStatus
This method maps directly to a RenderMoComp method of the D_MOTIONCOMPCALLBACKS structure, where:
   dwNumBuffers is zero.
   lpBufferInfo is NULL.
   dwFunction is defined as DXVA_COPPQueryStatusFnCode.
   lpInputData will point to a DXVA_COPPStatusInput data structure.
   lpOutputData will point to a DXVA_COPPStatusOutput data structure.
   Note that for the DX-VA device used for COPP, RenderMoComp will be called without calling BeginMoCompFrame or EndMoCompFrame.

Example

Mapping RenderMoComp to COPPQueryStatus

The sample code below shows how your driver should map the RenderMoComp DDI call into calls to COPPQueryStatus. The sample code only shows how the RenderMoComp function is used for COPP control. If a driver supports other DX-VA functions, such as decoding MPEG-2 video streams, the sample code can be extended to include processing of additional DX-VA GUIDs.

```
            case DXVA_COPPQueryStatusFnCode:
                {
                    DXVA_COPPStatusInput*
                    lpin = (DXVA_COPPStatusInput*)
                        lpData->lpInputData;
                    DXVA_COPPStatusOutput*
                    lpout = (DXVA_COPPStatusOutput*)
                        lpData->lpOutputData;
                    lpData->ddRVal =
                        pDXVACopp->COPPQueryStatus(lpin, lpout);
                }
                break;
            default:
                lpData->ddRVal = E_INVALIDARG;
                break;
            }
            break;
        }
    }
    return DDHAL_DRIVER_HANDLED;
}
```

COPPCloseVideoSession
This method maps directly to a DestroyMoComp method of the DD_MOTIONCOMPCALLBACKS structure.

Example

Mapping DestroyMoComp to COPPCloseVideoSession

The following sample code shows how a driver should map the DestroyMoComp DDI call into calls to COPPCloseVideoSession. The sample code shows only how the DestroyMoComp function is used for the COPP device. If a driver supports other DX-VA functions, such as decoding MPEG-2 video streams, the sample code can be extended below to include processing of additional DX-VA GUIDs.

```
DWORD APIENTRY
DestroyMoComp(
    LPDDHAL_DESTROYMOCOMPDATA lpData
    )
{
    AMTRACE((TEXT("DestroyMoComp")));
    DXVA_DeviceBaseClass* pDXVABase =
            (DXVA_DeviceBaseClass*)
            lpData->lpMoComp->lpDriverReserved1;
    if (pDXVABase == NULL) {
        lpData->ddRVal = E_POINTER;
        return DDHAL_DRIVER_HANDLED;
    }
    switch (pDXVABase->m_DeviceType) {
    case DXVA_DeviceContainer:
    case DXVA_DeviceDecoder:
    case DXVA_DeviceDeinterlacer:
    case DXVA_DeviceProcAmpControl:
        lpData->ddRVal = DDERR_CURRENTLYNOTAVAIL;
        break;
    case DXVA_DeviceCOPP:
        {
            DXVA_COPPDeviceClass*
            pDXVADev = (DXVA_COPPDeviceClass*)pDXVABase;
            lpData->ddRVal =
            pDXVADev->COPPCloseVideoSession( );
            delete pDXVADev;
        }
        break;
}
```

CONCLUSION

Various embodiments described above enable media content protection by establishing a secure communication channel and, in some embodiments, a secure data channel, between a device such as a computer running a protected content playback application, and an associated driver, such as a graphics driver, of an associated display device such as a monitor, flat panel LCD, television and the like. Various embodiments address the needs of content providers and application vendors to signal that content protection should be applied to media output by utilizing an output adapter which physically links the computer and its display device as the gateway for the protected video path.

The various embodiments provide a means for securely passing commands from a user mode playback application to a driver, such as a graphics driver, and securely returning status from the driver to the user mode application. The described embodiments establish a secure communication channel and allow a user mode application to instruct an associated driver to enable content output protection on the physical connector between the computer and the display device.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system, comprising:
one or more processors;
memory; and
a software component maintained in the memory and executed on the one or more processors to:
establish a secure communication channel with a media playback application;
use the secure communication channel to receive instructions, command message, and status requests from the media playback application to enable one or more of a number of different types of content protection technologies to protect media content that is provided over a physical connector, at least one of the status requests being configured to retrieve information that pertains to the command message that was sent from the media playback application and to retrieve information that is not associated with the command message; and
for at least some of the content protection technologies, receive instructions to configure the content protection technologies.

2. The system of claim 1, wherein the software component comprises a software driver.

3. The system of claim 1, wherein the software component is further configured to use the secure communication channel to send status information to the media playback application.

4. The system of claim 1, wherein the software component is further configured to use the secure communication channel to send status information to the media playback application, wherein the status information pertains to instructions that were previously received from the media playback application.

5. The system of claim 1, wherein the software component is further configured to use the secure communication channel to send status information to the media playback application, wherein the status information does not pertain to instructions that were previously received from the media playback application.

6. A method, comprising:
establishing trust between a media playback application and a downstream component;
establishing a secure channel between the media playback application and the downstream component using a public key associated with the downstream component to encrypt:
a random number provided by the downstream component;
a data integrity key; and
one or more starting numbers;
sending the encrypted data to the downstream component;
using the secure channel to send a command message to the downstream component, the command message comprising a data section that contains a command, and an authentication section that contains data that is used to authenticate the command;
using the secure channel to transmit a status request that requests status information from the downstream component, the status request being configured to retrieve information that pertains to the command message that was sent to the downstream component and to retrieve information that is not associated with the command message; and
using the secure channel to receive a status message from the downstream component, the status message comprising a data section that contains status information, and an authentication section that contains data that is used to authenticate the status information.

7. The method of claim 6, wherein the one or more starting numbers comprise a starting status sequence number and a starting command sequence number, the starting status sequence number and the starting command sequence number being useable to ascertain, respectively, whether a status message or a command message has been lost.

8. The method of claim 6, wherein the using the secure channel to request status information from the downstream component comprises sending, with the request, a random number, and wherein the authentication section of the status message comprises data associated with the random number.

9. The method of claim 6, wherein the authentication section of the command message and the authentication section of the status message each include data that has been processed using the data integrity key.

10. The method of claim 6, wherein the command message contains a command instructing the downstream component to enable one or more of a number of different types of content protection technologies to protect media content that is provided over a physical connector.

11. The method of claim 10, further comprising using the secure channel to provide protected media content to the downstream component.

12. The method of claim 11, further comprising determining whether the one or more content protection technologies are wholly supported by hardware for the physical connector.

13. The method of claim 12, further comprising:
playing the media content if the one or more content protection technologies are wholly supported by hardware for the physical connector; and
choosing either to not play the media content or to play a limited version of the media content if the one or more content protection technologies are not wholly supported by hardware for the physical connector.

14. A system, comprising:
one or more processors;
memory; and
a software component maintained in the memory and executed on the one or more processors to:
establish trust with a media playback application;
establish a secure channel with the media playback application by providing a public key associated with the software component to the media playback application and receiving back, from the media playback application, encrypted data that has been encrypted with the public key, the encrypted data comprising:
a random number previously provided by the software component;
a data integrity key; and
one or more starting numbers;
use the secure channel to receive a command message from the media playback application, the command message comprising a data section that contains a command and an authentication section that contains data that is used to authenticate the command;

use the secure channel to receive status requests from the media playback application, the status requests being configured to retrieve information that pertains to the command message that was sent from the media playback application and to retrieve information that is not associated with the command message; and use the secure channel to send a status message to the media playback application, the status message comprising a data section that contains status information and an authentication section that contains data that is used to authenticate the status information.

15. The system of claim 14, wherein the one or more starting numbers comprise a starting status sequence number and a starting command sequence number, the starting status sequence number and the starting command sequence number being useable to ascertain, respectively, whether a status message or a command message has been lost.

16. The system of claim 14, wherein the authentication section of the command message and the authentication section of the status message each include data that has been processed using the data integrity key.

17. The system of claim 14, wherein the command message contains a command instructing the software component to enable one or more of a number of different types of content protection technologies to protect media content that is provided over a physical connector.

18. The system of claim 14, wherein the command message contains a command instructing the software component to enable one or more of a number of different types of content protection technologies to protect media content that is provided over a physical connector, and wherein the software component is configured to enable a plurality of different types of content protection technologies.

19. The system of claim 17, wherein the software component is further configured to choose either to not play the media content or to play a limited version of the media content if the one or more content protection technologies are not wholly supported by hardware for the physical connector.

* * * * *